United States Patent [19]
Kurtz

[11] 3,908,192
[45] Sept. 23, 1975

[54] STANDARD AND COLOR TELEVISION REPRODUCTION FROM SUPERPOSED MONOCHROME IMAGES APPARATUS AND METHOD

[75] Inventor: Clark N. Kurtz, Rochester, N.Y.

[73] Assignee: Eastman Kodak Company, Rochester, N.Y.

[22] Filed: Sept. 25, 1970

[21] Appl. No.: 75,458

[52] U.S. Cl. .................. 358/5; 350/162 SF
[51] Int. Cl. ........................... H03b 33/00
[58] Field of Search .............. 178/5.4 BD, 5.2 D; 350/162 SF, 162 R; 95/12.2; 353/20, 99, 31; 358/5

[56] References Cited
UNITED STATES PATENTS

| | | | |
|---|---|---|---|
| 3,113,179 | 12/1963 | Glenn, Jr. | 178/6.6 TP |
| 3,337,718 | 8/1967 | Harper et al. | 178/DIG. 28 |
| 3,539,710 | 11/1970 | Cross et al. | 178/5.4 |
| 3,572,900 | 3/1971 | Bouche | 178/5.4 BD |
| 3,573,353 | 4/1971 | Henriques | 350/162 SF |
| R25,169 | 5/1962 | Glenn | 358/62 |

Primary Examiner—Robert L. Griffin
Assistant Examiner—John C. Martin
Attorney, Agent, or Firm—L. F. Seebach

[57] ABSTRACT

Phase and/or amplitude diffraction gratings superposed on component scenes stored on a monochromatic storage medium are scanned by a flying spot scanner. Photoelectric transducers such as photocells are positioned to sense first order aperture images produced thereby. Signals generated by the photocells can be used to reconstruct a composite scene comprising the component scenes as from color separation scenes. In addition, a single scene can be reproduced by the use of a single photocell and selective scene storage retrieval.

11 Claims, 8 Drawing Figures

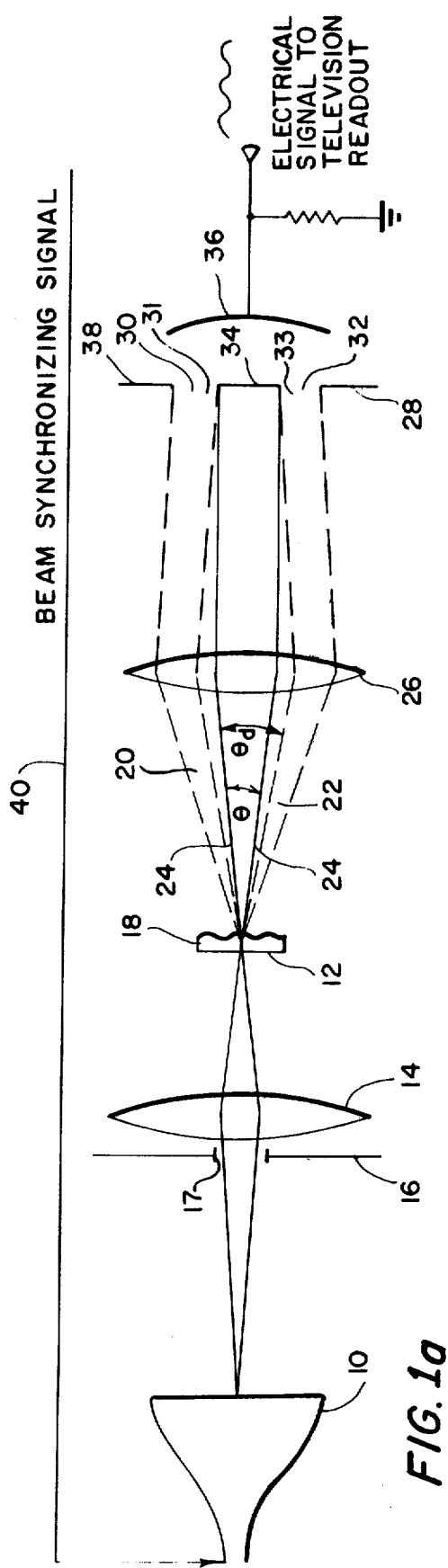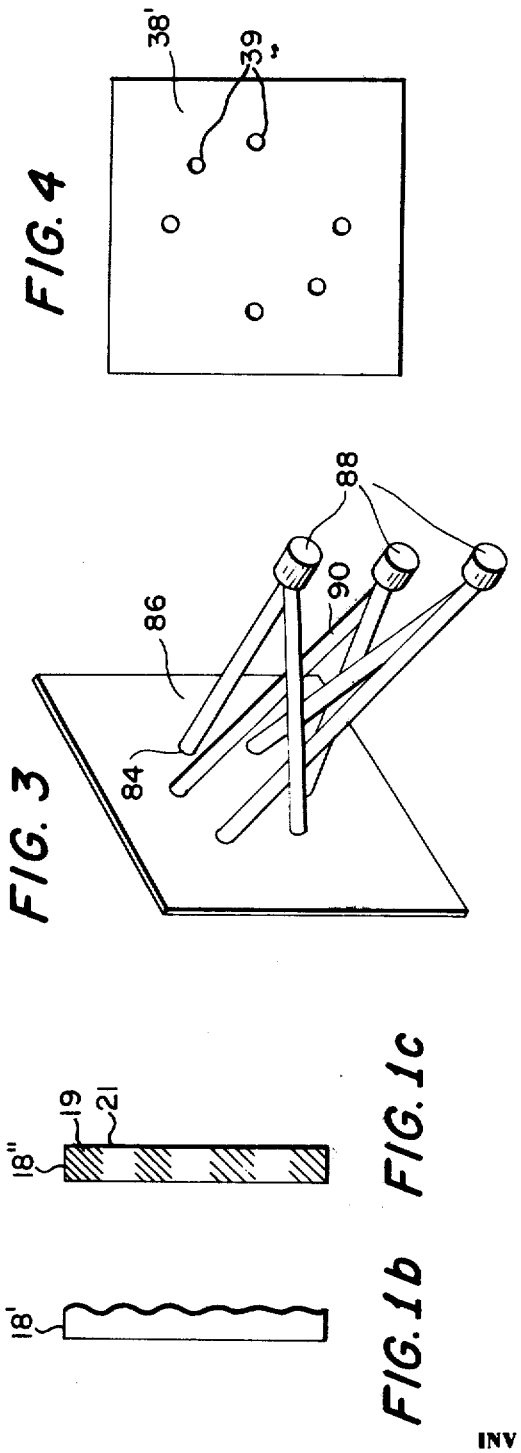

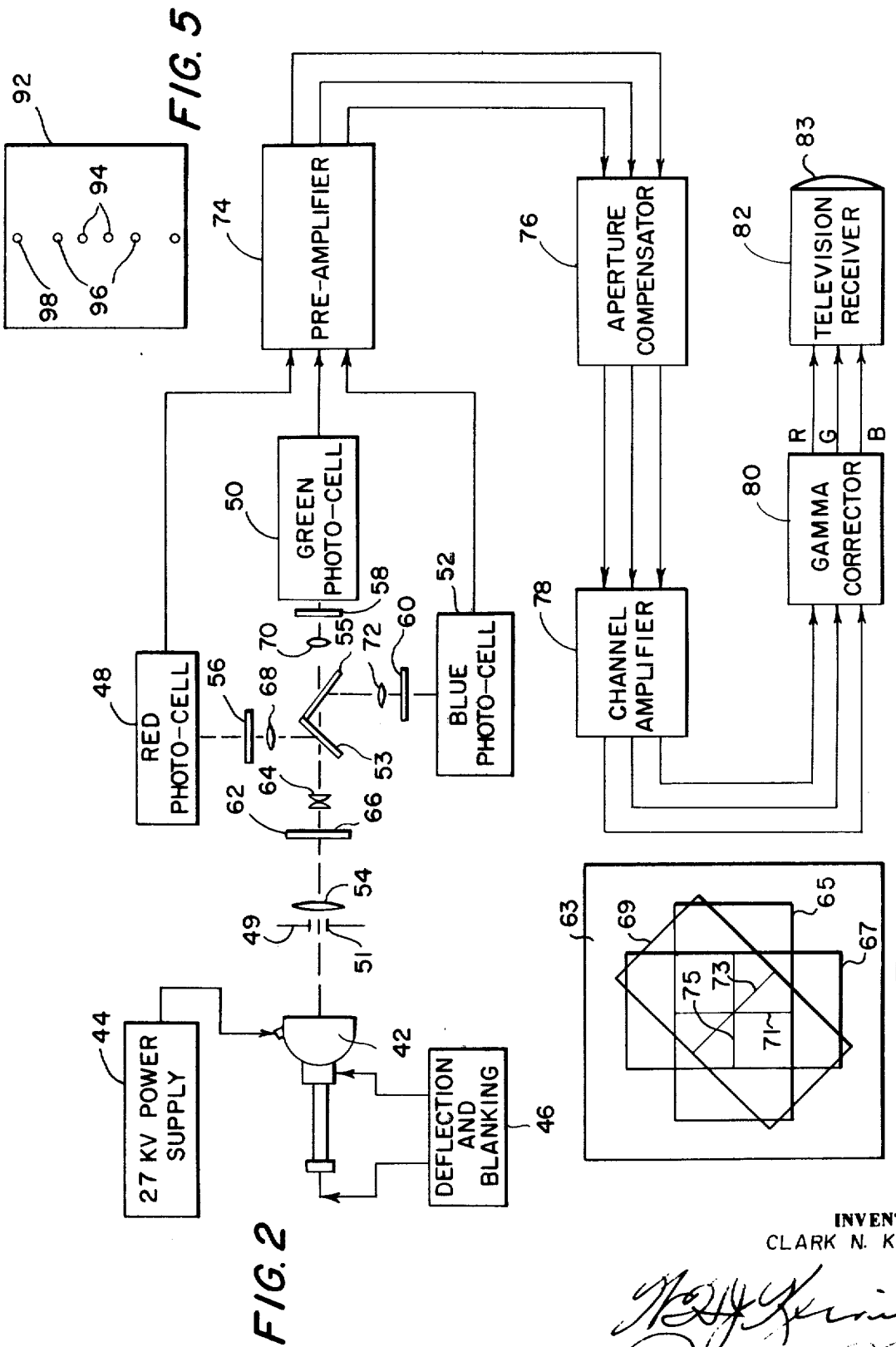

STANDARD AND COLOR TELEVISION REPRODUCTION FROM SUPERPOSED MONOCHROME IMAGES APPARATUS AND METHOD

FIELD OF THE INVENTION

The present invention relates to scanning apparatus and method utilized to produce composite images from photographically stored component images.

BACKGROUND OF THE INVENTION

One prior art device is described in U.S. Pat. No. 3,044,358. An electric beam charge pattern forms three superimposed diffraction gratings simultaneously on a thermoplastic film. The gratings correspond point-by-point to the red, green and blue component colors of a televised picture to be reproduced. The televised picture appears on a projection screen when the optical projector transmits a light beam through a first light mask thereby splitting the beam into a plurality of beams. A second light mask limits the area through which these beams pass to a frame on the film containing the gratings after which a third light mask bars unwanted light, allowing the first orders of the diffracted colors to be focused on a screen to form a color representation of the televised picture.

In another prior art system, monochrome phase holograms are read out with a laser and picked up on a vidicon in an expensive and complicated television system in which increased bandwidth is needed to separate the color channels.

Typical of such a prior art device is the RCA Selectavision in which a chosen subject film is first copied with an electron beam recorder to produce a "color master" film which is then developed and converted by a laser and separate diffraction gratings into a hologram on a plastic film coated with photoresist, a material that hardens to varying degrees, depending on the intensity of light striking it. After processing into a phase hologram, the photoresist film is then coated with nickel after which the photoresist film is stripped away to expose a nickel "master" which is used thereafter to impress the hologram into a clear, vinyl plastic tape.

In one television system, two side bands are required to process the blue and green color information which is extracted with electronic filters from the original image since the vidicon views a single color image produced by a laser passing through the hologram. The two side bands appear as fine lines on the face of the vidicon, which must have extended bandwidth to resolve them.

Yet other prior art systems are capable of forming a composite image from a plurality of adjacently stored component images thereby using up to three times the area than required by the present invention to store a given quantum of information.

The prior art systems are characterized by storage mediums relatively inefficiently used compared to those of the present invention and wherein relatively little information is stored for the space utilized. Expensive and long complicated procedures are involved in storing and reading out information. Restriction in beam and optical systems selected are necessary and more complex apparatus than that necessary to practice the present invention is used in such prior art devices.

In accordance with the present invention, a method and apparatus for standard and color television image reproduction of composite scenes from component scenes stored on a photostorage medium such as a monochromatic transparency in superposition are provided.

A flying spot scanner or other light beam generating device can be used in conjunction with spatial filtering systems to produce a composite image representative of a full color scene as viewed by the eye from stored monochromatic component images which are each representative of a color component of the full color scene. A scanning beam is projected through a transparency containing stored information such as, for example, the above mentioned component scenes. Superposed with the component scenes in the transparency are diffraction gratings or grids, each such grating corresponding to a component scene and which diffract the beam. From the diffracted beam, preselected light images of an aperture of a desired order, e.g., first order, are then caused to impinge upon photoelectric transducers, as for example, photocells. Electrical signals generated by the photocells as a result of the preselected order images impinging thereon are then transmitted to an output receiver and image reconstruction device, as for example, the display tube of a color or black and white television receiver.

One advantage of the present invention is that no registration problems are experienced. Because only one scanner is used, synchronization is automatic. Registration problems appear in prior art systems wherein multiple stored images are scanned simultaneously by several scanners which must be externally synchronized.

Another advantage of the invention is that economical storage of relatively large amounts of color scene information in a relatively small amount of monochromatic storage space is obtained. Another advantage of the instant invention is that it is easily operable within a wide range of scanning beam frequencies. Yet, another advantage is that extended bandwidth is not required of the electronics since the scanning system automatically provides channel separation and amplitude detection. Furthermore, relatively simple and fast readout of stored information is achieved with the present invention, yet the invention can be readily incorporated into existing systems with minor modification to such systems.

Still other objects and advantages of the present invention will be readily apparent to those skilled in the art from the following description and appended claims with reference to the drawings in which like characters denote like parts and wherein:

FIG. 1a is a schematic representation of an optical information readout system embodying the present invention;

FIG. 1b is a schematic cross-section of a transparency bearing scene information recorded as an amplitude modulated phase diffraction grating exposed on an emulsion;

FIG. 1c is a schematic representation of a cross-section of an amplitude modulated amplitude diffraction grating exposed on an emulsion;

FIG. 1d is a schematic front view of an emulsion exposed to three diffraction gratings angularly disposed with respect to one another which can be used in the embodiments shown in FIGS. 1a and 2;

FIG. 2 is a block diagram of a preferred embodiment of the invention;

FIG. 3 is a perspective view of an alternative photoelectric readout system to the one incorporated in FIGS. 1a and 2;

FIG. 4 is a front view of still another photoelectric readout system which can be used with the embodiment shown in FIGS. 1a and 2; and FIG. 5 is a front view of yet another photoelectric readout system which can be used with the embodiment shown by FIGS. 1a and 2.

DESCRIPTION OF THE PREFERRED EMBODIMENTS

A full color image similar to the image seen by the normal human eye in viewing a scene in life can be reproduced by the present invention in the form of a composite image. Before describing further the present invention a brief description of the storage media will be provided.

This composite image referred to above is the resultant image constructed by optically combining, for example, in accordance with the principals of the present invention, component images corresponding to three component colors of the scene from life. Such component images can be recorded on, for example, a multilayer emulsion monochromatic photographic recording media in which the layers are sensitive respectively to red, green and blue, the three chosen component colors. Each layer in the media records a separate component scene after being first pre-exposed to a corresponding diffraction grating. Thus, three diffraction gratings of preselected frequencies in parallel or angularly disposed with respect to one another can be pre-exposed on the multilayer emulsion in a superposed relationship to minimize image overlap and crosstalk. The component scenes can then be recorded on the media in a one-to-one relationship to the gratings and in superposition to one another and the gratings.

A single layer mixed grain monochromatic photographic storage media can also be used to record supergraphic component images after the media is first pre-posed component images after the media is first pre-exposed to the gratings angularly disposed with respect to one another.

It will be appreciated that for a black and white television scene to be projected, one recorded component scene is sufficient; thus, a plurality of recorded superposed different images could be supplied to a plurality of black and white television display tubes.

The following explanation of the storage principles involved is of a two-component scene embodiment for purposes of simplicity. In forming the image storage transparency, let $R_1$ and $R_2$ denote two diffraction gratings and let $S_1$ and $S_2$ denote two component scenes. It is to be understood that more than two scenes can be superposed in storage in accordance with these principles. Alternatively, one scene at a time can be stored. Suitable transparencies are imbued with complex amplitude transmittances $T_A$, substantially of the form:

1. $T_A \alpha (\gamma_1 R_1 S_1 + \gamma_2 R_2 S_2)$,
2a. $T_A \alpha_{ei}(\gamma_1 R_1 S_1 + \gamma_2 R_2 S_2)$, or
2b. $T_A \alpha_{ei}[\gamma_1 R_1 (1-S_1) + \gamma_2 R_2 (1-S_2)]$ or a combination of these, where $\gamma_1$ and $\gamma_2$ are real constants indicative of the relative strengths and polarities of the recorded signals. Transparencies of these types can be formed, for example, in the manner set forth in U.S. patent application Ser. No. 75,459 to Higgins et al, now U.S. Pat. No. 3,663,221, entitled COLOR RECORDING ON PANCHROMATIC SENSITIZED MATERIAL BY ADDITIVE MODULATION OF PRE-EXPOSED GRATINGS, and filed concurrently with the present application; U.S. patent application Ser. No. 75,460 to Eisen et al, now abandoned, entitled PHASE IMAGE STORAGE IN COLOR PHOTOGRAPHY, and filed concurrently with the present application; and U.S. Pat. No. 3,425,770 to Mueller et al. In the phase image embodiments, modulation can be caused by the variations in optical path due to (1) image relief, (2) internal variations in index of refraction and (3) a combination of (1) and (2).

Referring to FIG. 1a, a scanning source of light, for example, a flying spot scanner 10 is imaged onto a transparency 12 containing grating 18 and a recorded scene which is not shown since a cross sectional view of a grating cannot be clearly drawn. Grating 18 can be a phase modulating grating as shown in FIG. 1b as 18' or it can be amplitude modulating as shown in FIG. 1c or it can be alternating areas of denser 19 and less as 18'' with alternating areas of denser 19 and less dense 21 regions. A combination phase and amplitude modulating grid can also be used as can a phase modulating grating having variable indices of refraction therethrough which cannot be drawn and is hence not shown. It will be appreciated that other diffraction producing media of refracting and reflecting characteristics can be freely substituted by those skilled in the art.

First imaging lens system 14 is used, in conjunction with a suitable mask 16 having a stationary aperture 17 upon which the beam of flying spot scanner 10 is caused to impinge, to form an image of the flying spot raster on transparency 12. The light beam of the flying spot raster is focused onto transparency 12 with lens 14. Thus, the rays to be diffracted incident on transparency 12 are focused rather than parallel as in prior art systems. Due to the grating structure 18, on transparency 12, which can be that shown represented by FIGS. 1b and 1c in cross-section, the light beam is diffracted by the transparency. For the single grating 18 on transparency 12, two first order diffraction beams 20 and 22 appear on each side of the normal or zero order beam 24. It is recognized that higher order beams may exist, but for purposes of simplicity of illustration higher order beams are not shown in the drawing. It will be appreciated that in some cases higher order beams, i.e., above the first order, can be used in practicing the present invention. The first order beam is used in the preferred embodiment since its intensity is greater than that of higher order beam and it can therefore be more readily utilized.

A second lens system 26 focuses first order beams 20 and 22 on aperture plate 38 in the aperture image plane 28 as images 31 and 33 of aperture 17 at areas 30 and 32, one appearing on either side of the normal or zero order beam 24 impinging on blocking shield 34 in plane 28. In other words, the scanned light beam focused to a spot on the transparency 12 has sufficient spatial coherence to form separate images 31 and 33 of the aperture 17 in the aperture image plane 28. It is to be understood that aperture 17 need not be a single aperture. It could be an array of apertures or some other form of multiple aperture or an aperture of oval, square, triangular or other shape as long as its zero and first order images are separate in the aperture image plane.

The separation of first order aperture images 31 and 33 and their relative angular positions on image plane 28 depends on the spatial frequency and angular orientation of the grating 18 on transparency 12. For purposes of illustration, only two first order aperture images 31 and 33 are shown in FIG. 1a. A stationary pickup 36 monitors the flux in aperture images 31 and 33 which is passed through an aperture plate 38 at areas 30 and 32. First order beams 20 and 22 are thusly transmitted to photocell 36 which generates a signal representative of their relative strength. The zero order aperture image formed by beam 24 is blocked at area 34 so as not to impinge upon photocell 36.

It will be appreciated that images of the transparency 12 are not formed by the lens system 26 at plane 28. Rather, the aperture 17 is imaged, enabling a fixed aperture and fixed photocells to be used thereby establishing a simple and novel combination.

The bounds of the transparency 12 define the scene's perimeters. The only portion of the system needing extended bandwidth to accomodate more channels is the film containing the transparency. It will be appreciated that the film is the easiest and most economical component in the combination to change to acquire increased bandwidth.

For reproduction of a single scene at a time such as for black and white television, only a single photocell need be used along with a manner of first or other order image selection such as exemplified by aperture plate 38. Generally more images will be present, two for each grating on transparency 12. However, the intensity of light diffracted by grating 18 varies with the amplitude modulation of the grating, i.e., with the scene information recorded. If separate photocells are used to monitor the first order aperture images generated by each of three gratings, they simultaneously generate synchronized electrical signals corresponding point-by-point to the three component scenes recorded as the beam of scanner 10 scans the storage media. These signals can be generated one at a time or simultaneously to form a color television picture from three component color signals on the screen of a television receiver having a scan synchronized with the flying spot scanner 10 by a beam synchronizing signal 40 as will be more particularly explained hereinafter.

The aperture plate 38 is not limited to preselected openings corresponding to all the images of a certain order. For example, a single first order could be the only passed image, or if desired, other orders could be utilized.

In the embodiment shown in FIG. 1a, first order aperture images do not overlap the zero order image. It is to be understood that if other sets of aperture images are utilized, there preferably should be no overlap of the aperture images chosen for pickup and other images of intensity sufficient to effect detection. Noise in the pickup can be minimized by constructing the device in accordance with known parameters so that chosen image overlap with blocked images is minimal.

As shown in FIG. 1a, $\theta_d \geq \theta$ for the desired results. For small angles and assuming a wavelength of approximately $0.5\mu$, the condition $\theta_d \geq \theta$ is satisfied approximately when $$\nu c \geq (2000/f^*{}_{eff}) + \nu\text{max}$$

(3)

where $\nu_c$ is the carrier frequency in cycles/mm, $\nu$max is the maximum scene spatial frequency recorded in transparency 12 and $f^*{}_{eff}$ is the effective $f$-number of the cone of light illuminating transparency 12. When more than one grating 18 is present, it is important that the first order aperture images of any one such grating do not overlap first order aperture images of any other such grating as well as the zero order aperture image of any grating. For such a device it can be necessary to use grating frequencies higher than indicated by (3).

When the transparency 12 is described by (1), no crosstalk exists when there is no image overlap and the photocell receiving information from component scene 1 does not receive any information from component scene 2.

For transparencies of the form described in (2a) and (2b), crosstalk can occur if $\gamma_1$ and $\gamma_2$ are too large. Essentially, $\gamma_1$ and $\gamma_2$ must each be small enough to produce zero order images of a strength independent of scene information such as is discussed in copending U.S. patent application Ser. No. 74,459 in the name of Higgins et al, now U.S. Pat. No. 3,663,221, referred to above and schematically represented in FIG. 1d. For this latter type of transparency, it is also desirable to select grating angles and/or frequencies such that any higher order images of the aperture used do not overlap the first order images since overlap can result in a visible Moire grating pattern on the display tube of the television receiver.

It is desirable that flying spot scanner 10 be required to resolve 525 spots/line for standard television resolution so that it can be used with a standard television receiver for readout. Such flying spot scanners are readily available on the market. Lens system 14 which can be a plurality of lenses or a single lens insures the same resolution/line on transparency 12 so that the grating structure, which is finer than 525 spots/line, is not resolved. The resulting diffraction by a plurality of gratings causes automatic separation of the channels for readout. Consequently, no part of the system need have a bandwidth greater than a conventional television set since the gratings are not resolved as required in several prior art systems. Addition of another scene simply results in the generation of another output channel by the scanner.

It is to be understood that the transparency 12 can represent a negative of the scene rather than the scene itself. Reversal can be accomplished electronically.

Furthermore, although transmission type transparencies are discussed, it is readily apparent that equivalent systems could use a reflection type photographic element.

Referring to FIG. 2, a system incorporating the present invention for producing a three color televison picture using three channels is shown. This system embodies the principles set forth in the explanation of FIG. 1 and shown therein. The system includes a scanner 42 such as, for example, Radio Corporation of America Color Slide Scanner M1-40514 with a power supply 44 and deflection and blanking control circuitry 46. In use, the red, green and blue filters of the scanner are removed and aperture plates are introduced into the system. Plates 56, 58 and 60 are placed in front of each photocell 48, 50 and 52, in planes optically conjugate to aperture 49 of plate 51. Partially transmitting mirrors 53 and 55 split the single beam into three parts and aperture plates 56, 58 and 60 each pass the appropriate pair of first order images. Aperture plate 56 passes first order images corresponding to red scene information to photocell 48, aperture plate 58 passes first order images corresponding to green scene information to photocell 50 and aperture plate 60 passes first order images corresponding to blue scene information to photocell 52. All zero order and unwanted higher order images are blocked by the aperture plates. It should be noted that, as stated hereinabove, the invention is not limited to the use of first order images and other useable orders can be utilized. Color filters are not needed between the objective lens 54 and the photocells 48, 50 and 52 as normally required for a color slide scanner, since the aperture plates provide separation of the color information. Neither is it necessary to have scanner 42 generate light having components of red, green and blue as normally required for a color slide scanner. The spectral composition of the light is uncritical since properly selected apertures will of themselves eliminate crosstalk between, for example, red channel and green channel or red channel and blue channel first order and higher order images.

Where the three scenes represent color components of a color scene, each modulated carrier grating can have a frequency of 125 cycles/mm and be positioned at approximately 0°, 45° and 90° with respect to some reference axis along center line 71 as shown in FIG. 1d as emulsion 63 with gratings 65, 67 and 69 having axes 71, 73 and 75 respectively, pre-exposed thereon and as fully disclosed in copending U.S. patent application Ser. No. 75,459 to Higgins et al, now U.S. Pat. No. 3,663,221. Objective lens 54 images the flying spot through aperture 49 onto monochromatic transparency 62. The orientation of the gratings (collectively designated 66) associated with the three component scenes determines the respective orientations of the aperture plates in front of the corresponding photocells; the size and spacing of each hole in a particular aperture plate is the same as the size and spacing of the first order images of aperture 49 in plate 51. Lenses 64, 68, 70 and 72 can be used to obtain images of aperture 49 in plate 51 of the desired resolution at the aperture plates 56, 58 and 60. The choice of locations and lenses is well known in the art.

Transmission to a television receiver 82 containing display tube 83 is accomplished by a well known television system comprising a three channel preamplifier 74 receiving the signals of photocells 48, 50 and 52. Aperture compensator 76, channel amplifier 78 and Gamma corrector 80 are used to produce signals transmitted to television receiver 82 in a form useable by the receiver in accordance with well known principles of television which are not part of this invention. Photocells 48, 50 and 52 need not be of the same sensitivity although this is preferred, since the signals are separately amplified and otherwise treated in the television circuitry.

Although the above system, for purposes of illustration, demonstrates the principles of the present invention, it is realized that other systems utilizing these same principles can be devised.

For use in the embodiment of FIGS. 1a and 2, as shown in FIG. 3, all first order images at points 84 could be formed at a retaining structure 86 located in one plane and selected for transmission to the appropriate photocells 88 by means of, for example, fiber optics 90. In this case, there would be no need for aperture plates since the inherent selectivity of the fibers themselves would perform the function of the aperture plates. Alternatively as shown in FIG. 4, an array of photodetectors 39 could be placed coinciding with the first order images directly on a supporting member 38', in which case the array itself functions selectively as an aperture plate. The photocells need not be of different sensitivities, but in a preferred realization would all be of the same type with a spectral response peak matching the peak emission wavelength of the scanning light source.

If in the systems shown in FIGS. 1a and 2, it is so desired, a multilayer emulsion with parallel superposed diffraction gratings can be used. With gratings of different frequencies so place, an aperture plate containing a set of photo pickups displaced in a single line with respect to one another to receive selected images of preferably the first order as is shown in FIG. 5 can be used. Plate 92 contains photo pickups at points 94, 96 and 98, each pair of points being the loci of the pair of first order images generated by each grating.

In operation, a flying spot scanner such as that designated 42 in FIG. 2 generates a beam which passes through aperture plate 51 containing aperture 49, through objective lens 54 and then through transparency 62 containing modulating means 66. Lens systems 64, 68, 70 and 72 in conjunction with the partially transparent mirrors 53 and 55 separate out the various color components, for example, components which correspond to red, green and blue, passing them through aperture plates 56, 58 and 60 to corresponding photocells 48, 50 and 52. Signals generated by photocells 48, 50 and 52 are transmitted to the previously described three channel preamplifier 74 having a channel corresponding to each color component. Preamplifier 74 transmits preamplified signals representative of light elements red, green and blue in three channel aperture compensator 76. Still in three channels, signals representative of the colors are passed to channel amplifier 78 and thereon to gamma corrector 80 from where they can be utilized by television receiver 82 which reproduces the composite image stored as component scenes on transparency 62 in full color or alternatively in black and white. For black and white television system one scene could be stored on transparency 62 and one photocell and single channel amplifier and compensator could be used. A standard black and white television receiver could then adequately reproduce the image stored on element 62.

Further advantages are that standard bandwidth television receivers can be used. Where a plurality of component scenes are stored in superposition, component scenes are automatically separated into separate channels so that no channel requires more than standard television bandwidth.

Another important advantage of the present invention is that a plurality of component scenes can be stored superposed on a single transparency in the form of amplitude modulated phase gratings, amplitude modulated amplitude gratings, or a combination of these embodiment. One scanning operation retrieves all the superposed composite scenes in register. Such component scenes can represent the color components of a composite scene. Thus, a color composite scene can be stored as superposed component scenes on a single layer monochromatic storage medium or on a multilayer monochromatic emulsion.

The invention has been described in detail with particular reference to certain preferred embodiments thereof, but it will be understood that variations and modifications can be effected within the spirit and scope of the invention.

We claim:

1. A color image reconstruction device for use with:
   a television receiver having a display tube adapted to present a color image in response to synchronized electrical input signals representing color component information, and
   a photostorage element containing color component scenes and associated diffraction gratings, said device comprising:
   means for scanning the photostorage element through an aperture with light focused onto said element to form a light beam modulated by and representative of the component scenes and gratings of the photostorage element and carrying a plurality of orders of images of said aperture including a first order,
   means for focusing the first order images of said aperture carried by said modulated beam in spaced relation on an image plane,
   means including photoelectric transducer means responsive to said modulated beam and positioned in said image plane to receive said first order images for producing electric signals proportional to the received images, and
   means for applying said signals in synchronism with each other and with the scanning means to the display tube whereby a composite color image is presented on the display tube representing the optically combined component scenes of the photostorage element.

2. The invention of claim 1 wherein said means for focusing the first order images of said aperture includes means for separating said spaced images into a nonoverlapping relation on said image plane.

3. The invention of claim 1 wherein said focusing means includes means for blocking images other than said first order images from said photoelectric transducer means.

4. The invention of claim 1 wherein said focusing means includes means for separating said first order images from other orders of images of said aperture and means for blocking such other order images from said photoelectric transducer means.

5. The invention of claim 1 wherein said focusing means includes lens means.

6. The invention of claim 1 wherein said scanning means includes means for imaging the light of the scanning means on said photostorage element.

7. A method for reconstructing a color image on the display tube of a television receiver from a photostorage element containing at least two component scenes and associated diffraction gratings comprising:
   scanning the photostorage element through an aperture with focused light to produce a light beam modulated by and representative of the component scenes and gratings of the photostorage element and carrying a plurality of orders of images of the aperture including the first order, focusing the first order images of the aperture on photoelectric transducers for producing electrical signals which are representative of the intensity of such focused first order images and applying the electrical signals to the television receiver to produce a color image on the display tube corresponding to the optically combined component scenes.

8. The method of claim 7 and further comprising directing the focused first order images onto the photoelectric transducers in a non-overlapping spaced relationship.

9. The method of claim 7 and further comprising blocking images other than the focused first order images from the photoelectric transducers.

10. The method of claim 7 and further comprising separating the focused first order images from other orders of images and blocking such other orders of images from the photoelectric transducers.

11. A color image reconstruction device for use with:
    a television receiver having a display tube adapted to present a color image in response to synchronized electrical input signals representing color component information, and
    a photostorage element containing a plurality of color component scenes and associated diffracting means, said device comprising:
    means for scanning the photostorage element through an aperture with light focused onto said element to form a plurality of modulated light beams corresponding in number to and representative respectively of said component scenes and associated diffracting means, said beams carrying a plurality of orders of images of said aperture including first orders respectively for the plurality of component scenes and associated diffracting means,
    means for focusing in spaced relation on an image plane the first order images of said aperture,
    means including photoelectric transducer means responsive to said modulated beams and positioned in said image plane to receive said first order images corresponding to said component scenes and associated diffracting means for producing electric signals proportional to the received images, and
    means for applying said signals in synchronism with each other and with the scanning means to the display tube whereby a composite color image is presented on said tube representing the optically combined component scenes of the photostorage element.

* * * * *